(12) United States Patent
Pierres et al.

(10) Patent No.: US 10,919,360 B2
(45) Date of Patent: Feb. 16, 2021

(54) MOTOR VEHICLE HEATING, VENTILATION AND/OR AIR CONDITIONING DEVICE AND CORRESPONDING ADDITIONAL MODULE AND METHOD OF ASSEMBLY

(71) Applicant: Valeo Systemes Thermiques, Le Mesnil Saint Denis (FR)

(72) Inventors: Philippe Pierres, Le Mesnil Saint-Denis (FR); Jan Liska, Prague (CZ)

(73) Assignee: Valeo Systemes Thermiques, Le Mesnil Saint Denis (FR)

( * ) Notice: Subject to any disclaimer, the term of this patent is extended or adjusted under 35 U.S.C. 154(b) by 204 days.

(21) Appl. No.: 15/738,154

(22) PCT Filed: Jun. 30, 2016

(86) PCT No.: PCT/EP2016/065282
§ 371 (c)(1),
(2) Date: Dec. 20, 2017

(87) PCT Pub. No.: WO2017/009055
PCT Pub. Date: Jan. 19, 2017

(65) Prior Publication Data
US 2018/0194192 A1    Jul. 12, 2018

(30) Foreign Application Priority Data

Jul. 10, 2015    (FR) ...................................... 1556557

(51) Int. Cl.
*B60H 1/00*    (2006.01)
*B60H 1/34*    (2006.01)

(52) U.S. Cl.
CPC ..... *B60H 1/00064* (2013.01); *B60H 1/00564* (2013.01); *B60H 1/34* (2013.01);
(Continued)

(58) Field of Classification Search
CPC ............ B60H 1/00064; B60H 1/00542; B60H 1/00564; B60H 2001/00092;
(Continued)

(56) References Cited

U.S. PATENT DOCUMENTS 6,568,468 B1    5/2003   Uemura et al.
6,874,575 B2 *  4/2005   Kim ................... B60H 1/00064
                                                              165/204

(Continued)

FOREIGN PATENT DOCUMENTS

EP    1634735 A1    3/2006
FR    2778152 A1    11/1999
JP    2015-080959 A  4/2015

OTHER PUBLICATIONS

International Search Report issued in PCT/EP2016/065282 dated Sep. 30, 2016 (2 pages).

(Continued)

*Primary Examiner* — Eric S Ruppert
*Assistant Examiner* — Hans R Weiland
(74) *Attorney, Agent, or Firm* — Osha Bergman Watanabe & Burton LLP

(57) ABSTRACT

The invention relates to a motor vehicle heating, ventilation and/or air conditioning device (2) comprising a housing (4) comprising: —a duct (14) for distributing a flow of air at foot level in the front of the said vehicle, —a first (15) and a second (22) mixing chamber, a dividing flap (32) separating the said mixing chambers (15, 22). According to the invention, —the housing (4) has a first opening (17) opening into the first mixing chamber (15) and a second opening (27) opening into the second mixing chamber (22), one on each side of the dividing flap (32), and an assembly cavity near the said duct (14), —the said device (2) further comprises: •a partition (C) able to close off the first (17) or the second (27) opening according to the mode of operation, and •an (Continued)

additional module (200; 300) arranged in the assembly cavity to delimit a canal for the circulation of the flow of air between the first (14) or the second (27) opening and the said duct (14). The invention also relates to a corresponding additional module (200; 300) and to a corresponding method of assembly.

13 Claims, 5 Drawing Sheets

(52) U.S. Cl.
CPC ............... *B60H 2001/002* (2013.01); *B60H 2001/00164* (2013.01)

(58) Field of Classification Search
CPC .......... B60H 2001/00135; B60H 2001/00164; B60H 2001/00185; B60H 2001/002
See application file for complete search history.

(56) References Cited

U.S. PATENT DOCUMENTS

| | | | |
|---|---|---|---|
| 2003/0037918 A1 | 2/2003 | Lee et al. | |
| 2004/0069483 A1* | 4/2004 | Natsume | B60H 1/00064 165/204 |
| 2005/0217295 A1* | 10/2005 | Alberternst | B60H 1/00542 62/239 |
| 2006/0151161 A1* | 7/2006 | Richter | B60H 1/00064 165/203 |
| 2009/0117841 A1* | 5/2009 | Goto | B60H 1/00064 454/127 |
| 2010/0035533 A1* | 2/2010 | Dubief | B60H 1/00564 454/127 |

OTHER PUBLICATIONS

Written Opinion of the International Searching Authority issued in PCT/EP2016/065282 dated Sep. 30, 2016 (6 pages).

\* cited by examiner

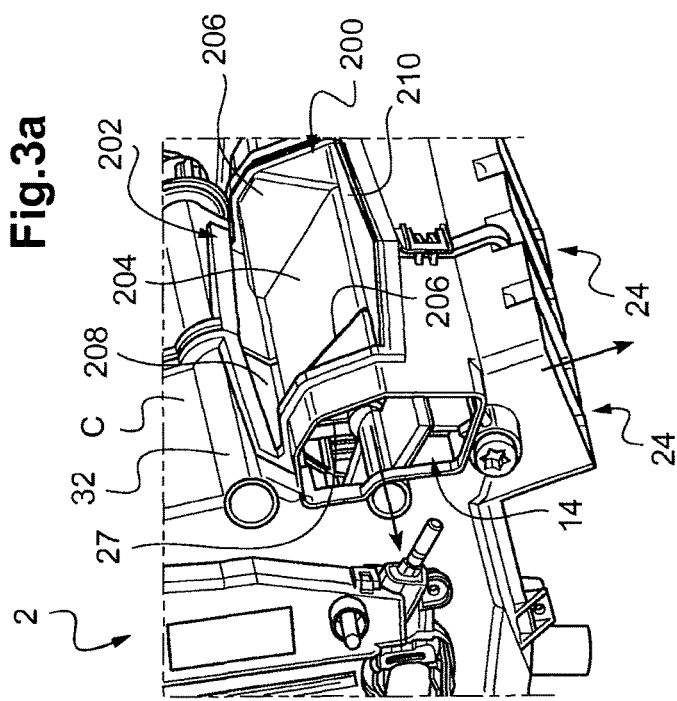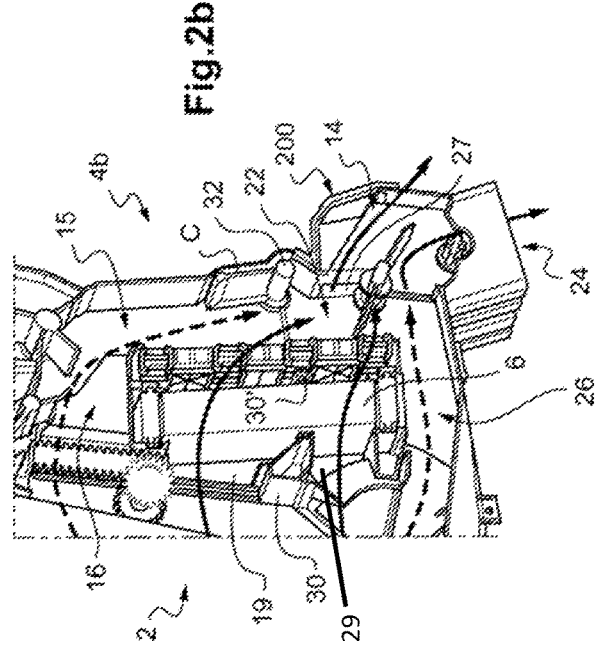

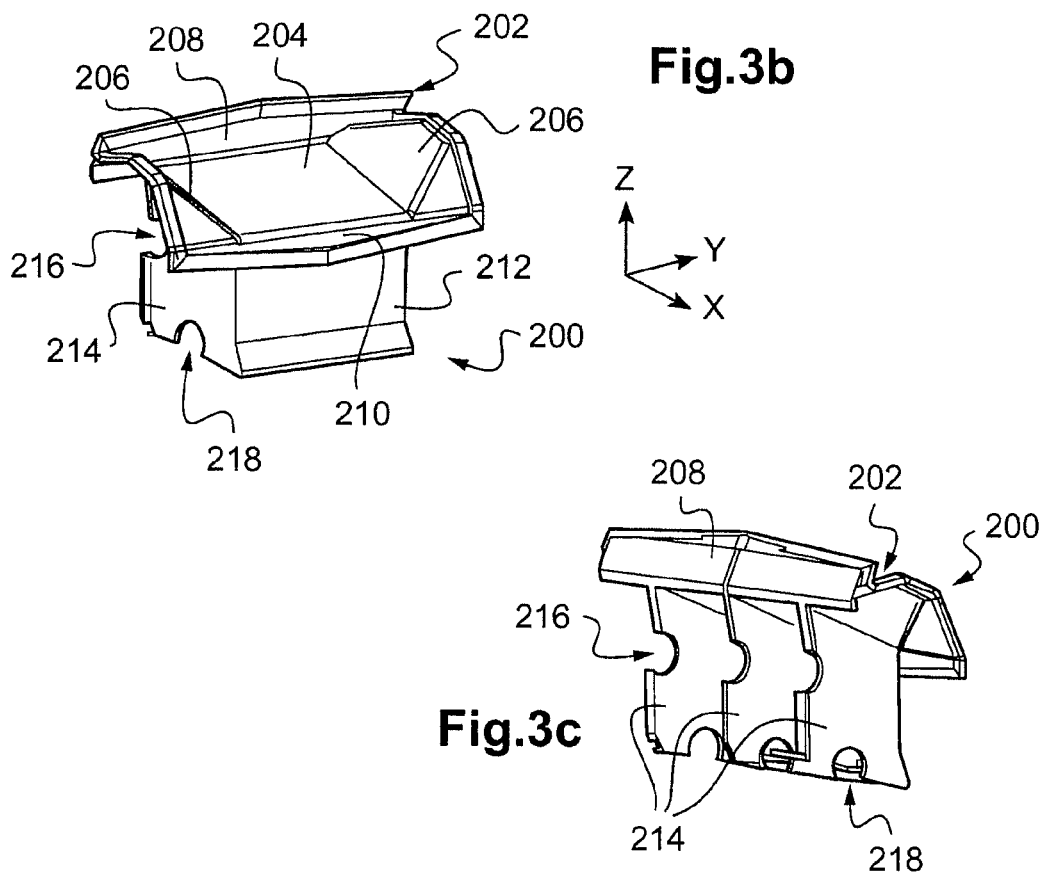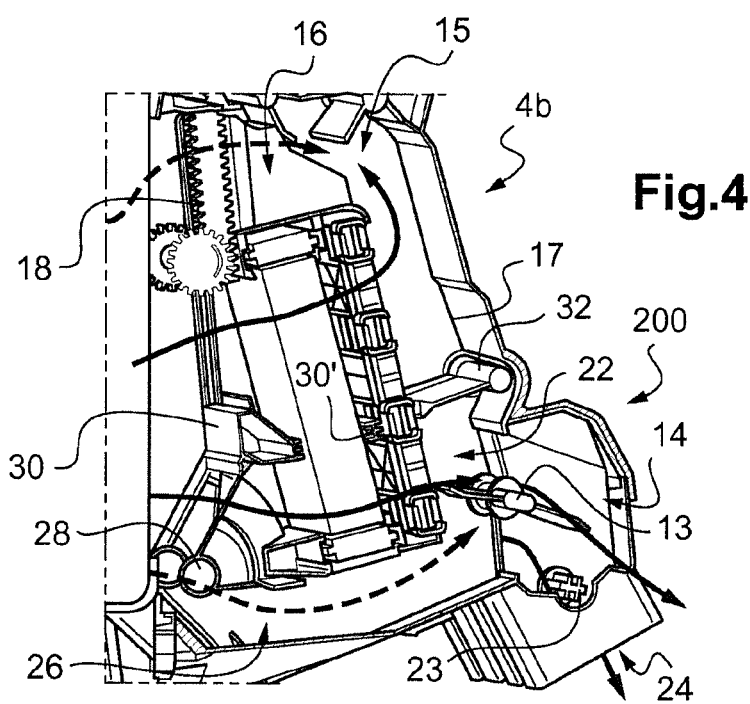

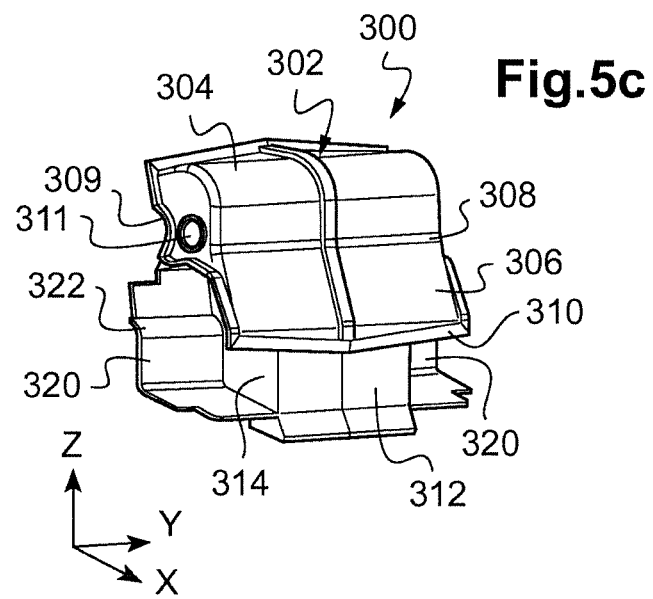
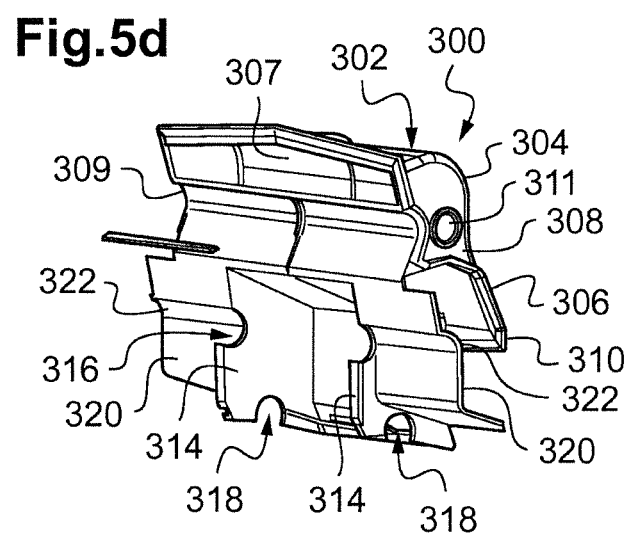

MOTOR VEHICLE HEATING, VENTILATION AND/OR AIR CONDITIONING DEVICE AND CORRESPONDING ADDITIONAL MODULE AND METHOD OF ASSEMBLY

TECHNICAL FIELD OF THE INVENTION

The present invention concerns the field of heating, ventilation and/or air conditioning devices for motor vehicles. The invention also concerns an additional module for such a heating, ventilation and/or air conditioning device, and a method of assembly of said device.

PRIOR ART

A motor vehicle is frequently equipped with a heating, ventilation and/or air conditioning device to regulate the aerothermic parameters of an air flow distributed towards the interior of the vehicle cabin. Such a device is normally known as HVAC (heating, ventilation and air conditioning). The device generally comprises a housing delimited by partitions in which openings are provided, including at least one air inlet and at least one air outlet.

In the known fashion, a pulser is used to cause the air flow to circulate from the air inlet of the air outlet. This may be a fresh air flow from the outside of the vehicle, or a recycled air flow from the vehicle cabin, or a mixture of external and recycled air flows.

The housing also contains thermal conditioning means such as heat exchangers for heating and/or cooling the air flow prior to its distribution inside the cabin. For example, the thermal conditioning means may comprise an evaporator which is intended to cool and dehumidify the air flow passing through it, and a heating element, in particular a radiator, which may be associated with an additional radiator and is intended to heat the air flow passing through it.

In these devices, it is known to have an evaporator arranged downstream of the air inlet in the flow direction of the air flow, such that the entire air flow entering the housing is dehumidified by the evaporator. Then the cold air flow thus generated is introduced into a main mixing chamber and/or oriented towards a heating element, in particular a radiator and in some cases an additional radiator, in order to obtain a warm air flow.

The main mixing chamber serves for mixing one or more cold and/or warm air flows such that the air flow resulting from the mixing with the desired reference temperature is distributed towards specific zones of the motor vehicle cabin. The main mixing chamber is provided with a first mixing element, such as a flap, in order to define the proportions of cold air flow and warm air flow entering the main mixing chamber. This mixing element thus allows adjustment of the temperature of the mixed air flow intended to be distributed into dedicated zone(s) of the cabin, such as for example the front and rear zones.

However, it is also desirable to provide a possibility of independent thermal management of the different zones of the vehicle, in particular for top range vehicles. To achieve this, the housing also contains a secondary mixing chamber intended to generate a secondary air flow to ventilate one or more other zones of the cabin.

The secondary mixing chamber is also in aeraulic communication with the heating element and able to receive all or part of the air flow which has passed through the evaporator of the heating, ventilation and/or air conditioning device. The secondary mixing chamber is equipped with a second mixing element, such as a flap, to define the proportions of the cold air flow and warm air flow entering the second mixing chamber in order to adjust the temperature of the air flow distributed into the other zones of the vehicle.

In this case, the main mixing chamber is generally provided in an upper part of the heating, ventilation and/or air conditioning device, while the secondary mixing chamber is generally provided in a lower part of the heating, ventilation and/or air conditioning device.

With a heating, ventilation and/or air conditioning device functioning in a three-four zone mode, it is known that the main mixing chamber supplies the outlet nozzles at the front of the vehicle cabin, including the outlet nozzles towards the front footwell, while the secondary mixing chamber supplies the outlet nozzles at the rear of the cabin.

Also, as explained above, the heating, ventilation and/or air conditioning device may be supplied either with air from outside the vehicle (also called fresh air) or with recycled air, i.e. air from the vehicle cabin. Depending on the operating conditions, it may be particularly beneficial to introduce external air into the cabin through the demisting nozzles situated close to the windscreen, after heating by the heating, ventilation and/or air conditioning device, and conversely to return recycled air to the cabin through the footwell nozzles. In order to guarantee this separation between the external and recycled air flows while being able to select or adjust optimally the type of air to be supplied, so-called "double layer" installations are known.

The external air is generally of low humidity when cold compared with the recycled air, but may be relatively cold, in particular in winter conditions. Since the humidity level of fresh air is relatively low, the risk of creating mist on the windscreen is therefore also low.

Recycled air however generally has a higher humidity level than external air and is at a temperature close to the target temperature, i.e. close to the reference temperature defined for example by the driver or passenger. In this way, even in winter conditions, it is possible to heat this recycled air to the reference temperature more quickly before it is returned to the cabin. User comfort is greatly improved and the risk of creating mist on the windscreen is low, since this recycled air is output at a distance from the windscreen.

In this case, it is known for the main mixing chamber to supply fresh external air to the demisting nozzles, while the secondary mixing chamber supplies the outlet nozzles for the front footwell and the rear footwell of the cabin.

Depending on the operating mode of the heating, ventilation and/or air conditioning device, the outlet nozzles—and in particular the outlet nozzle distributing the air flow to the front footwell of the vehicle—are not necessarily supplied by the same mixing chamber.

A specific heating, ventilation and/or air conditioning device is therefore required depending on the operating mode selected.

There is no standard heating, ventilation and/or air conditioning device allowing both operation for one-two zone or double layer thermal conditioning, in which the footwell region in either the front or rear zone of the vehicle is supplied with air by a mixing chamber different from that supplying the demisting nozzles, and for three-four zone operation allowing air to be supplied to the front and rear of the cabin separately by two separate mixing chambers. In fact, at least part of the housing of the heating, ventilation and/or air conditioning device must be designed differently, depending on whether it must condition the air flow directed towards one or more zones of the cabin.

Also, motor vehicle manufacturers wish to be able to transpose heating, ventilation and/or air conditioning devices easily from one vehicle to another, in particular from one vehicle model to another.

In addition, motor vehicle manufacturers now wish to reduce ever further the space required for these heating, ventilation and/or air conditioning devices.

PRESENTATION OF THE INVENTION

The object of the invention is to remedy these problems of the prior art at least partially by proposing a heating, ventilation and/or air conditioning device in the context of thermal conditioning for one or more zones of the vehicle, which is easily adaptable for various operating modes, in particular one-two zones, double layer or also three-four zones.

For this, the invention proposes a device for heating, ventilation and/or air conditioning of a motor vehicle, said vehicle cabin comprising a front zone and a rear zone in the direction of travel of said vehicle, said device comprising a housing containing:
 a duct for distributing an air flow to the footwell in the front zone of said vehicle,
 a first air flow mixing chamber,
 a second air flow mixing chamber,
 a separating flap arranged movably so as to isolate or connect the first mixing chamber and the second mixing chamber.
According to the invention,
 the housing has
  a first opening leading to the first mixing chamber,
  a second opening leading to the second mixing chamber, the first and second openings being arranged on either side of the separating flap,
  an assembly cavity near said duct,
 and said device furthermore comprises:
  a partition able to close the first or the second opening according to the operating mode of said device, and
  an additional module arranged in the assembly cavity of the housing in aeraulic communication with said duct and with the first opening when the second opening is closed, or with the second opening when the first opening is closed, so as to delimit selectively a circulation channel for the air flow between the first opening and said duct, or between the second opening and said duct.

Thus, depending on whether the heating, ventilation and/or air conditioning device is operating in a one-two zone, double layer or three-four zone mode, the appropriate additional module is arranged on the housing at the duct for distributing an air flow into the footwell region of the front zone of the vehicle, called the front footwell outlet duct, so as to supply the front footwell outlet duct selectively by the first mixing chamber or by the second mixing chamber when the two mixing chambers are independent, or by both mixing chambers when they are dependent. This facilitates adaptation of the device to the demands of motor vehicle manufacturers in particular.

In this case, it is sufficient to adapt at least partly the face of the housing receiving the additional module, wherein the rest of the housing remains unchanged and can therefore be standardized.

In particular, this face of the housing receiving the additional module may, in one mode, have one or the other of the openings leading to an associated mixing chamber, while in another mode this opening is closed by a partition, for example a partition of the housing or of the appropriate additional module.

Said device may also comprise one or more of the following characteristics taken separately or in combination:
 the first and second openings are arranged on either side of the separating flap in a vertical axis in the state mounted on the vehicle;
 the additional module has a form complementary to the form of the assembly cavity;
 the housing comprises two end faces in a longitudinal axis congruent with the longitudinal axis of the vehicle when the device is a state mounted in said vehicle, and the additional module is arranged at a longitudinal end face of the housing;
 the additional module is mounted on a face of the housing, and the partition closing the first opening or the second opening depending on the operating mode of said device is a partition of the face of the housing intended to receive the additional module;
 the partition closing the first opening or the second opening depending on the operating mode of said device is provided on the additional module;
 the housing has a partition closing the first opening, and an additional module for a one-two zone or double layer mode is mounted on the housing so as to delimit a circulation channel for the air flow between the second opening and said duct, such that said duct is brought into communication with the second mixing chamber via the second opening, so that it can be supplied by the second mixing chamber and the air flow is able to circulate below the separating flap;
 the additional module for a one-two zone or double layer mode comprises a closing wall, closing the inlet of the assembly cavity;
 the closing wall has a form complementary to the form of the inlet of the assembly cavity, and has at least one substantially flat portion;
 said device comprises an additional module for a three-four zone mode mounted on the housing;
 the additional module for a three-four zone comprises firstly an outer wall delimiting the air flow circulation channel which connects the first opening of the housing to said duct, and secondly an inner wall forming a partition closing the second opening of the housing, such that said duct may be supplied by the first mixing zone and the air flow is able to circulate above the separating flap;
 the air flow circulation channel connects the first opening of the housing with said duct via the assembly cavity;
 the additional module for a three-four zone mode comprises an opening intended to be brought into aeraulic communication with the first opening of the housing;
 the additional module for a three-four zone mode is mounted on a face of the housing, and the outer wall of the additional module for a three-four zone mode comprises a first part extending along a curve and a second part extending substantially parallel to the face of the housing carrying said additional module;
 the additional module has an inflection point at the intersection of the first part and the second part of the outer wall of the additional module for a three-four zone mode;
 the first part of the outer wall of the additional module for a three-four zone mode is substantially outwardly curved or convex with a convexity oriented towards the outside of the additional module for a three-four zone mode;

the additional module for a three-four zone mode comprises a flap arranged movably in the air flow circulation channel;

said device comprises at least one heat exchanger, such as a radiator, arranged upstream of the separating flap in the flow direction of the air flow, such that each mixing chamber can receive an air flow which has passed through said at least one heat exchanger; and said device comprises a first bypass path of said at least one heat exchanger opening into the first mixing chamber, and a second bypass path of said at least one heat exchanger arranged at a distance from the first bypass path and opening into the second mixing chamber, said first and second bypass paths being arranged on either side of said at least one heat exchanger, such that each mixing chamber may receive an air flow which has bypassed said at least one heat exchanger.

The invention also concerns an additional module for such a device.

According to one aspect of the invention, this is an additional module for a one-two zone or double layer mode able to delimit a circulation channel for the air flow between the second opening of the housing of said device below the separating flap in a vertical axis when the device is in the state mounted in said vehicle, and said duct.

Said additional module comprises a closing wall able to close an inlet of an assembly cavity provided on the housing in order to receive said additional module, the inlet of the assembly cavity being for example situated below the separating flap in the vertical axis of said device.

According to another aspect of the invention, this is an additional module for a three-four zone mode, able to delimit a circulation channel for the air flow between the first opening of the housing of said device above the separating flap in a vertical axis when the device is in the state mounted in said vehicle, and said duct.

The additional module comprises:
an outer wall able to delimit said air flow circulation channel,
an opening intended to be arranged in aeraulic communication with the first opening of the housing, and
an inner wall forming a partition closing the second opening of the housing.

The opening of said additional module for a three-four zone mode is intended to be arranged above the separating flap in the vertical axis of said device in the state mounted in said vehicle.

Said additional module for a three-four zone mode has at least partially a form complementary to the shaft of the separating flap.

The additional module according to any embodiment may comprise a predefined number of side walls shaped to delimit sub-ducts of at least one duct of the housing, such as the duct for distributing an air flow to the front footwell of said vehicle.

The additional module according to any embodiment may form a support for a shaft of at least one flap arranged in at least one duct of the housing, such as the distribution duct for an air flow to the front footwell zone of said vehicle.

The invention also concerns a method of assembly of said heating, ventilation and/or air conditioning system as defined above for a motor vehicle, the cabin of said vehicle comprising a front zone and a rear zone in the direction of travel of said vehicle.

According to the invention, said method comprises the following steps:
assembly of a housing defining a duct for distributing an air flow to the front footwell zone of said vehicle, a first air flow mixing chamber, a second air flow mixing chamber, a first opening leading to the first mixing chamber, a second opening leading to the second mixing chamber, and an assembly cavity close to said duct, arrangement of a movable separating flap in the housing and between the first mixing chamber and the second mixing chamber so as to be able to isolate or connect the first mixing chamber and the second mixing chamber depending on the position of the separating flap, and also
a step of insertion and mounting of an additional module for a three-four zone mode in the assembly cavity of the housing in aeraulic communication with said duct and the first opening, so as to delimit a circulation channel for the air flow between the first opening and said duct, or a step of insertion and mounting of an additional module for a one-two zone or double layer mode in the assembly cavity of the housing in aeraulic communication with said duct and the second opening, so as to delimit a circulation channel for the air flow between the second opening and said duct, and a step of mounting a partition closing the first opening.

BRIEF DESCRIPTION OF THE FIGURES

Further characteristics and advantages of the invention will appear from reading the description below with reference to the attached figures, in which:

FIG. 2b is an enlarged sectional view of a portion of the heating, ventilation and/or air conditioning device of FIG. 2a;

FIG. 3a is a perspective view of a portion of the heating, ventilation and/or air conditioning device of FIG. 2a, showing in more detail the additional module for a one-two zone or double layer operating mode;

FIG. 3b is a first perspective view of the additional module for a one-two zone or double layer operating mode;

FIG. 3c is a second perspective view of the additional module for a one-two zone or double layer operating mode;

FIG. 4 is a partial sectional view of the heating, ventilation and/or air conditioning device in a double layer operating mode;

FIG. 5c is a first perspective view of the additional module for a three-four zone operating mode; and FIG. 5d is a second perspective view of the additional module for a three-four zone operating mode.

On these figures, identical elements carry the same references.

DETAILED DESCRIPTION OF EMBODIMENTS

The following embodiments are examples given for illustration of the subject of the invention. The invention is not limited to these embodiments. Although the description refers to one or more embodiments, this does not necessarily mean that each reference concerns the same embodiment, or that the characteristics apply only to a single embodiment. Single characteristics of different embodiments may also be combined to provide further embodiments.

In the description, certain elements may be indexed; in other words, reference may be made to a first element or to a second element for example. In this case, the indexing serves merely for differentiation and designation of similar but not identical elements. This indexing does not imply a priority of one element relative to another. Such designations could easily be interchanged without leaving the scope of the present invention.

Figure 1:
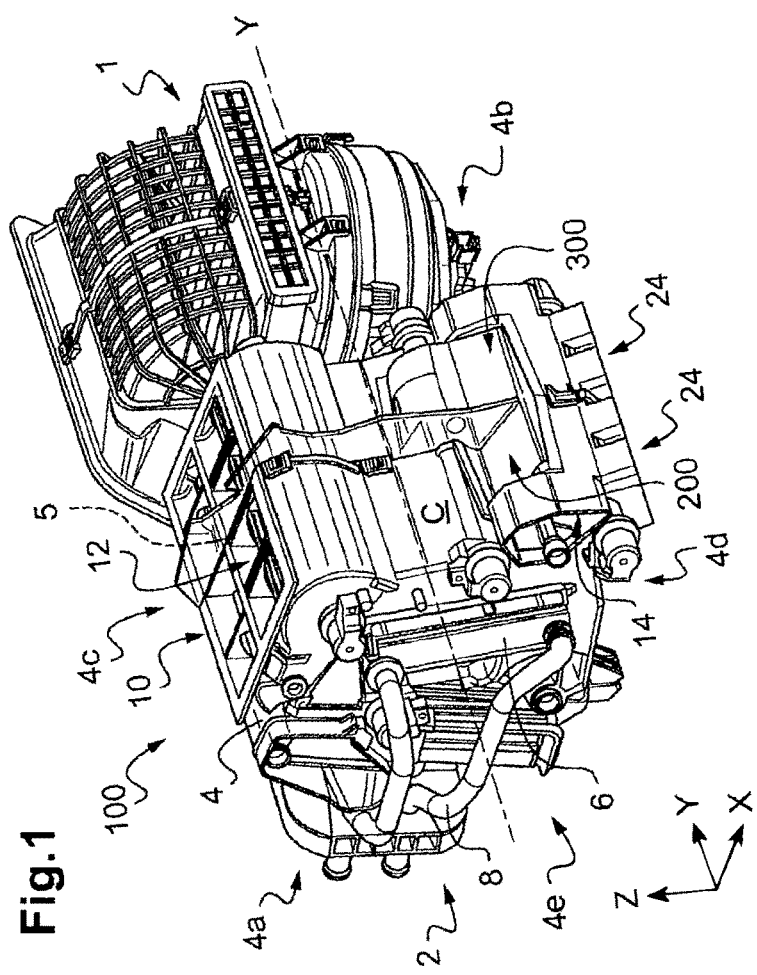
FIG. 1 shows diagrammatically a part of a heating, ventilation and/or air conditioning installation comprising a heating, ventilation and/or air conditioning device with an additional module for a one-two zone or double layer operating mode, or with an additional module for a three-four zone operating mode.

FIG. 1 shows part of a heating, ventilation and/or air conditioning installation 100 comprising an air inlet housing 1 and a heating, ventilation and/or air conditioning device 2 able to thermally condition the air flow coming from the air inlet housing 1.

The heating, ventilation and/or air conditioning device 2 is suitable for any known architecture, namely centered or semi-centered. A centered architecture corresponds to a heating, ventilation and/or air conditioning installation 100 of which the air inlet housing 1 (part of the housing comprising the pulser) and the main housing of the heating, ventilation and/or air conditioning device 2, in particular comprising heat exchange means, are arranged in a same longitudinal plane. A semi-centered architecture corresponds to a heating, ventilation and/or air conditioning installation 100 of which the air inlet housing 1 and the main housing of the heating, ventilation and/or air conditioning device 2 are not arranged in a same longitudinal plane, the air inlet housing being arranged at the side of the main housing.

Heating, Ventilation and/or Air Conditioning Device 2

Figure 2A:
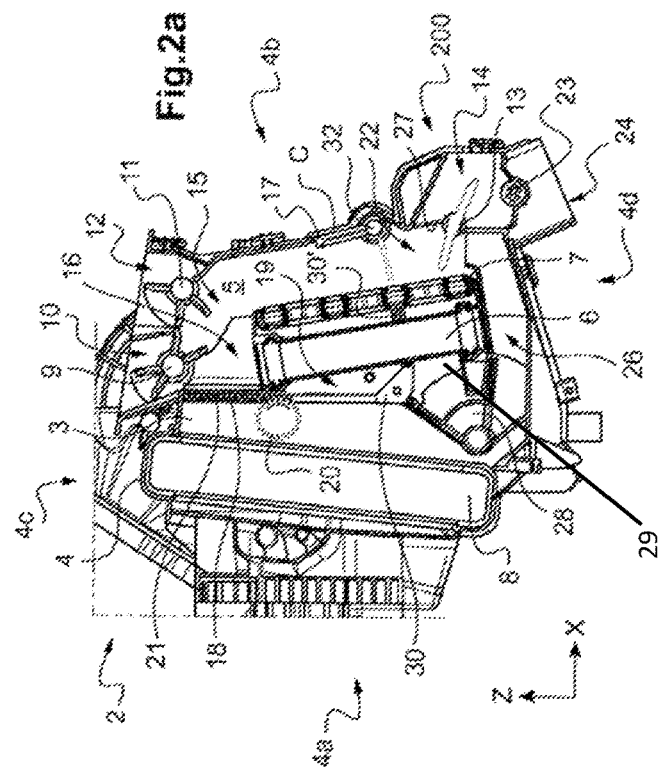
FIG. 2a is a profile view in cross-section of the heating, ventilation and/or air conditioning device comprising an additional module for a one-two zone operating mode.

The invention concerns the heating, ventilation and/or air conditioning device 2, best shown on FIG. 2a, comprising an flow channel 3 for the air flow, defined by a housing 4.

FIG. 2a shows a longitudinal axis X of the heating, ventilation and/or air conditioning device 2 which corresponds to a longitudinal front/rear axis of the vehicle, which is a horizontal axis, and an axis Z which is perpendicular to axis X and corresponds to the vertical top/bottom axis of the vehicle. In the present case, the terms "top" and "bottom", or "front" and "rear", refer to the arrangement of the elements of the figures, which corresponds to the arrangement of the elements in the state fitted in the vehicle and the direction of travel of the vehicle.

The housing 4 here has two opposite longitudinal end faces 4a, 4b along axis X, and two opposite upper 4c and lower 4d faces along axis Z which connect the two opposite side faces 4e along a transverse axis Y perpendicular to the plane XZ.

In the embodiment described, the housing 4 of the heating, ventilation and/or air conditioning device 2 may furthermore comprise an internal separating partition 5 arranged so as to divide the housing 4 into two halves which are advantageously equal.

With reference to FIG. 2a, the internal separating partition 5 extends in a median plane parallel to the plane XZ. Thus when the heating, ventilation and/or air conditioning device 2 is installed in the vehicle, the internal separating plane 5 is positioned substantially in the vertical position and in the longitudinal axis of the vehicle.

This internal separating partition 5 allows distinction between an air flow intended for the left-hand part of the cabin and an air flow intended for the right-hand part of the cabin.

The internal separating partition 5 also divides into two parts the components of the heating, ventilation and/or air conditioning device 2 which are housed in the housing 4.

The heating, ventilation and/or air conditioning device 2 furthermore comprises an additional module 200 for a one-two zone or double layer mode, or an additional module 300 for a three-four zone mode, arranged on the housing 4, here on a longitudinal end face 4b of the housing 4. To facilitate reading, these additional modules 200 and 300, which are described in more detail below, are known respectively as the first additional module 200 and the second additional module 300.

The housing 4 has an assembly cavity (not shown on the figures) which is configured to receive selectively the first additional module 200 or the second additional module 300 when mounted.

FIGS. 2a, 2b illustrate a heating, ventilation and/or air conditioning device 2 receiving the first additional module 200, most clearly shown on FIGS. 3a to 3c and able to operate a thermal conditioning in one-two zone mode.

FIG. 4 shows a heating, ventilation and/or air conditioning device 2 also receiving the first additional module 200 and able to operate a thermal conditioning in double layer mode.

Figure 5A:
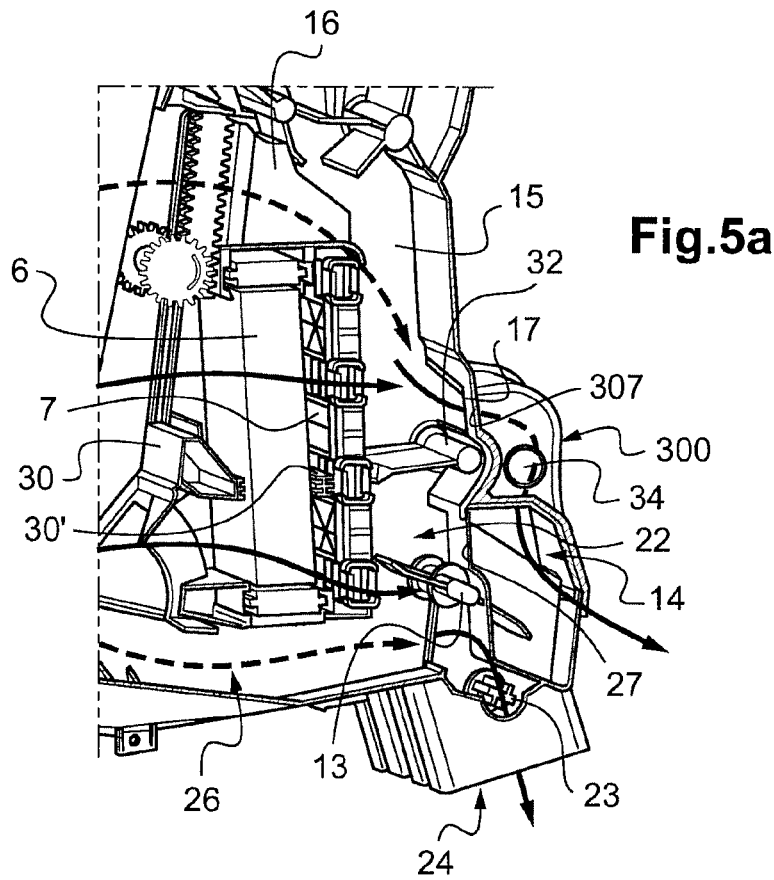
FIG. 5a is a profile view of a portion of the heating, ventilation and/or air conditioning device comprising an additional module for a three-four zone operating mode.
Figure 5B:
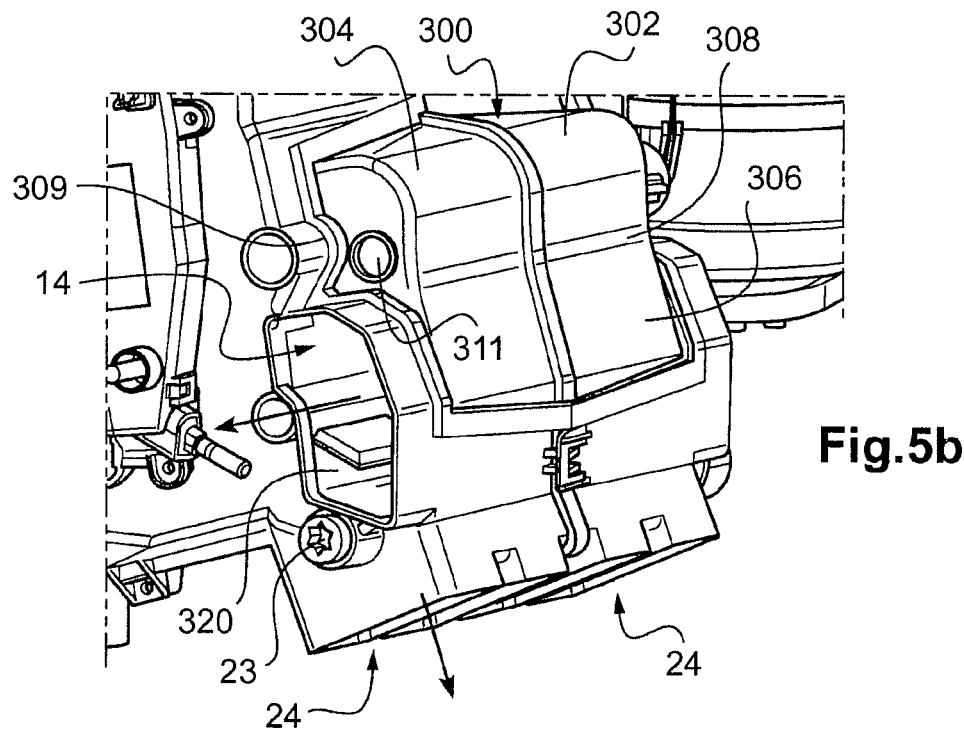
FIG. 5b is a perspective view of a portion of the heating, ventilation and/or air conditioning device of FIG. 5a, showing in more detail the additional module for a three-four zone operating mode.

Finally, FIGS. 5a and 5b illustrate a heating, ventilation and/or air conditioning device 2 receiving the second additional module 300, most clearly shown on FIGS. 5c and 5d.

Means for Thermal Conditioning and Distribution of the Air Flow in the Cabin

Means for Thermal Conditioning of the Air Flow Intended for the Cabin

Also, with reference again to FIGS. 1 and 2a, one or more thermal conditioning means 6, 7, 8 for the air flow intended to be distributed to the cabin are arranged in the housing 4 of the heating, ventilation and/or air conditioning device 2.

According to the embodiment illustrated, the thermal conditioning means comprise a first heat exchanger 6, for example a radiator, intended to heat at least part of the air flow circulating in the heating, ventilation and/or air conditioning device 2.

In the example illustrated, the first heat exchanger 6 has a generally substantially parallelepipedic form. In addition, the first heat exchanger 6 is for example arranged in the flow channel 3 of the air flow such that its height extends in a direction which is significantly inclined relative to the vertical axis Z.

In this example, the first heat exchanger 6 does not extend over the entire height of the flow channel 3.

The first heat exchanger 6 may in some cases be coupled to an additional electric radiator 7 intended to heat the air flow more quickly, in particular in the case of start-up of the vehicle. The electric radiator 7 advantageously extends substantially parallel to the first heat exchanger 6. The electric radiator 7 here has substantially the same height as the first heat exchanger 6 and so also does not extend over the entire height of the flow channel 3.

The thermal conditioning means may also comprise a second heat exchanger 8, for example an evaporator, arranged upstream of the first heat exchanger 6 in the air flow direction. The second heat exchanger 8 is arranged so as to cool and dehumidify the entire air flow circulating in the heating, ventilation and/or air conditioning device 2.

In the example illustrated, the second heat exchanger 8 has a generally substantially parallelepipedic form. Furthermore, the second heat exchanger 8 is arranged such that its height extends in a direction substantially parallel to the vertical axis Z.

The first and second heat exchangers 6, 8 may be arranged in a substantially parallel manner. As a variant, the heat exchangers 6, 8 may be slightly inclined relative to each other so as to form a V-shape, as illustrated on FIG. 2a. This arrangement contributes to the compactness of the heating, ventilation and/or air conditioning device 2.

Distribution of Conditioned Air Flow in the Cabin

The air flow is introduced into the housing 4 after having been thermally conditioned by at least one heat exchanger, here by the evaporator 8 and in some cases the radiator(s) 6 and 7 (FIG. 2a), whereupon the air flow is directed towards one or more outlets.

The or each outlet comprises one or more ducts distributing the air flows towards nozzles opening into the cabin.

In the example illustrated on the figures, the heating, ventilation and/or air conditioning device 2 comprises in particular:
- an air flow distribution duct 10 for the demisting nozzle allowing demisting of the windscreen,
- an air flow distribution duct 12 towards one or more side/center ventilation nozzles for cooling/warming passengers in the front of the vehicle, and
- an air flow distribution duct 14 towards an outlet nozzle in the front footwell of the cabin, for warming the feet of the passengers in the front of the vehicle. For reasons of clarity, this duct 14 is referred to below as the front footwell outlet duct 14.

These ducts 10, 12, 14 supply conditioned air to the front zone of the cabin.

According to the embodiment illustrated, the heating, ventilation and/or air conditioning device 2 also comprises one or more ducts 24 intended to supply conditioned air to the rear zone of the cabin, for example to direct the air flow towards an outlet nozzle in the rear footwell of the cabin, for warming the feet of the passengers in the rear of the vehicle, and/or towards one or more ventilation nozzles in the rear of the vehicle.

Each of these ducts 10, 12, 14, 24 may be subdivided into sub-ducts, in particular so as to supply the right and left-hand parts of the appropriate zone of the cabin, as can be seen on FIG. 1.

In addition, the heating, ventilation and/or air conditioning device 2 according to the invention may comprise flaps 9, 11, 13 (cf. FIG. 2a) arranged in the ducts 10, 12, 14 respectively, and allowing control/blocking of access of the air flows to the various nozzles opening into the front zone of the cabin.

Also, one or more flaps 23 may be provided arranged in the or each duct 24 for control/blocking of access of the air flow to the various nozzles opening into the rear zone of the cabin.

Architecture of the Housing 4

Upper Part of the Housing 4 of the Heating, Ventilation and/or Air Conditioning Device 2

In order to be able to distribute the air flows to the outlet nozzles at the desired temperatures, the heating, ventilation and air conditioning device 2 comprises a first air flow mixing chamber 15. A warm air flow and a cold air flow from the heat exchangers 6 and 8 respectively may be mixed in the first mixing chamber 15 in variable proportions, then directed towards the outlet nozzles opening into the cabin.

The first mixing chamber 15 according to the embodiment described is in the upper or top zone of the housing 4 in the vertical axis Z.

To guarantee that the cold air flow from the second heat exchanger 8, in this example an evaporator, is not thermally contaminated by the first heat exchanger 6, in this example a radiator, the heating, ventilation and/or air conditioning device 2 advantageously comprises a first bypass path 16 of the first heat exchanger 6. Thus the cold air flow which has passed through this second heat exchanger 8 may either circulate through the first heat exchanger 6 in order to be heated, or bypass the first heat exchanger 6 via the first bypass path 16 in order to retain its temperature.

The two warm and cold air flows are oriented in the direction of the first mixing chamber 15 in order to be mixed there and distributed towards the outlet nozzles at the reference temperatures.

With reference to FIG. 2b, the cold air flow which has passed through the second heat exchanger 8 may circulate through the first heat exchanger 6 as indicated in the diagram by the solid arrows, and/or bypass the first heat exchanger 6 via the first bypass path 16 as indicated by the dashed arrows.

Also, at a face of the housing 4, here a longitudinal end face 4b, the housing 4 has a first opening 17 leading to the first mixing chamber 15. This first opening 17 is therefore arranged downstream of the first mixing chamber 15 and the first bypass path 16 (where provided) in the flow direction of the air flow.

This first opening 17 is intended to be closed or open, depending on the selected operating mode of the heating, ventilation and/or air conditioning device 2.

The first opening 17 is closed on the left-hand part of FIG. 1 and on the embodiments of FIGS. 2a to 4. This first opening 17 may be closed by a partition C of the housing 4, here by a partition C of the longitudinal end face 4b of the housing 4 receiving the first additional module 200. This partition 4 may be produced integrally with the longitudinal end face 4b. In contrast, this first opening 17 is open, in the embodiment of FIGS. 5a and 5b, so that it can connect the first mixing chamber 15 to the front footwell outlet duct 14. Thus the air flow coming from the first mixing chamber 15 may circulate towards the front footwell outlet duct 14, passing through the first opening 17 and an air circulation channel defined by the second additional module 300, as will be described below.

Also, with reference again to FIG. 2a, the heating, ventilation and/or air conditioning device 2 may also comprise a first flap 18 allowing regulation of the proportion of cold air flow passing through the first heat exchanger 6 and the proportion of cold air flow passing through the first bypass path 16.

As illustrated on FIG. 2a, the first flap 18 is arranged upstream of the first heat exchanger 6 and downstream of the second heat exchanger 8 in the flow direction of the air flow. According to an embodiment not shown, it is possible to arrange the first flap 18 downstream of the first heat exchanger 6 in the flow direction of the air flow.

The first flap 18 is mounted so as to be movable between two extreme positions:

a position in which it blocks the access of the air flow, which in this example is a cold air flow leaving the evaporator 8, to the first bypass path 16, and a position in which it blocks the access of the cold air flow leaving the evaporator 8 to the first heat exchanger 6.

Naturally, the first flap 18 may assume any intermediate position.

Thus, depending on the position of the first flap 18, the cold air flow from the second heat exchanger 8 is oriented in variable proportions towards the first heat exchanger 6 and/or directly towards the first mixing chamber 15, then towards the ducts 10, 12, 14.

The first flap 18 is for example a sliding flap. More precisely, advantageously it is a flat sliding flap. With reference to FIG. 2a, the first flap 18 is arranged extending longitudinally along axis Z. More precisely, the first flap 18 slides along axis Z. According to the embodiment illustrated, the first flap 18 comprises a gate 21 on which a rack is arranged. In order to set the first flap 18 in motion, a gear 20 complementary to the rack is set in rotation, by an actuator (not shown), around a transverse axis substantially perpendicular to the plane XZ, substantially parallel to axis Y indicated on FIG. 1.

Rotation of the gear 20 drives the translation motion of the gate 21 between the two extreme positions of the first flap 18.

The access of the cold air flow to the first heat exchanger 6 is achieved for example via a first conduit 19 corresponding to a portion of the air flow channel 3 situated between a separating element 30, which will be described below, and the first heat exchanger 6.

Such a housing 4 may be used for a heating, ventilation and/or air conditioning device 2 adapted for homogenous thermal conditioning, wherein the different zones of the vehicle are ventilated at the same temperature; this is then described as a mono-zone or single zone heating, ventilation and/or air conditioning device.

Such a housing 4 may also be used for a heating, ventilation and/or air conditioning device 2 allowing a distinction of temperature between the left and right-hand parts of the cabin. This function is then referred to as bi-zone or dual zone, allowing separate control of the air flow directed towards the left-hand and right-hand seats of the cabin. In this case, independently controlled flaps may be provided in each of the left-hand and right-hand parts of the heating, ventilation and/or air conditioning device 2. The housing 4 in this case requires the internal separating partition 5 described above.

Lower Part of the Housing 4 of the Heating, Ventilation and/or Air Conditioning Device 2

In addition, it may be advantageous also to provide a distinction between the front and rear zones of the cabin. The operating mode is then described as the three-four zone mode, allowing a distinction between front and rear, and a distinction between the right and left parts of the front zone, and/or between the right and left parts of the rear zone.

For three-four zone operation, the housing 4 also requires the internal separating partition 5.

According to another example, it may be advantageous to distinguish the circulation of an external or fresh air flow, and a recycled air flow taken from the cabin. In fact, the external air flow has lower humidity than the recycled air flow and may be blown into the cabin at the demisting nozzles situated close to the windscreen, after being heated by the heating, ventilation and/or air conditioning device 2 for example; the recycled air flow from the cabin, which may in particular be heated more quickly, may be blown through the footwell nozzles at a distance from the windscreen, either to the front footwell or to the rear footwell region of the cabin.

Since the humidity level of the fresh air flow is relatively low, the risk of creating mist on the windscreen is therefore also low. Conversely, since the recycled air flow can be heated to the reference temperature more quickly, user comfort is greatly improved.

This is known as a double layer operating mode.

Thus, in order to allow in particular operation of the heating, ventilation and/or air conditioning device in three-four zone or double layer mode, the heating, ventilation and/or air conditioning device 2 comprises a second mixing chamber 22.

According to the embodiment described, the second mixing chamber 22 is situated in a lower or bottom part of the housing 4 in the vertical axis Z, as opposed to the first mixing chamber 15 which is situated in the upper or top part of the housing 4 in the vertical axis Z.

In a manner similar to the first mixing chamber 15, the second mixing chamber 22 allows the warm and cold air flows, from the heat exchangers 6 and 8 respectively, to be mixed in variable proportions and then directed towards at least one nozzle opening into the appropriate zone of the cabin via at least one duct 24.

In the same way as for the first mixing chamber 15, to guarantee that the cold air flow from the second heat exchanger 8 is not thermally contaminated by the first heat exchanger 6, the heating, ventilation and/or air conditioning device 2 advantageously comprises a second bypass path 26 of the first heat exchanger 6. The second bypass path 26 is here arranged remote from the first bypass path 16. In the example illustrated, the two bypass paths 16 and 26 are arranged on either side of the first heat exchanger 6 in the vertical axis Z.

Thus the cold air flow which has passed through the second heat exchanger 8 either circulates through the first heat exchanger 6 in order to be heated, or bypasses the first heat exchanger 6 via the second bypass path 26 in order to retain its low temperature. Both the warm and cold air flows are directed towards the second mixing chamber 22 in order to be mixed there and distributed to the outlet nozzles of the appropriate zone of the vehicle at the reference temperatures.

Also, at its longitudinal end face 4b, the housing 4 has a second opening 27. This is the same longitudinal end face 4b of the housing 4 having the first opening 17 leading to the first mixing chamber 15.

The second opening 27 leads to the second mixing chamber 22. This second opening 27 is therefore arranged downstream of the second mixing chamber 22 and the second bypass path 26 (where provided) in the flow direction of the air flow.

In this example, the second opening 27 is arranged on the housing 4 so as to lead to the assembly cavity which is in aeraulic communication with the front footwell outlet duct 14.

The second opening 27 is open on the embodiments of FIGS. 2a to 4, and allows connection of the second mixing chamber 22 to the front footwell outlet duct 14. In contrast, the second opening 27 is closed in the embodiment of FIGS. 5a and 5b. This second opening 27 may be closed by a partition provided on the second additional module 300 for a three-four zone mode, as described below.

Depending on the selected operating mode of the heating, ventilation and/or air conditioning device 2, either the first opening 17 or the second opening 27 is closed while the other remains open so as to allow connection of the front footwell outlet duct 14 to the one or the other associated mixing chamber 15 or 22.

Also, in order to achieve mixing in variable proportions, the heating, ventilation and/or air conditioning device 2 may comprise a second flap 28 allowing regulation of the proportion of cold air flow passing through the first heat exchanger 6 and the proportion of cold air flow passing through the second bypass path 26.

The second flap 28 is advantageously arranged on the same side of the first heat exchanger 6 as the first flap 18. As illustrated in FIG. 2a, the second flap 28 is arranged upstream of the first heat exchanger 6 and downstream of the second heat exchanger 8 in the flow direction of the air flow. According to an embodiment not shown, it is possible to arrange the second flap 28 upstream of the first heat exchanger 6 in the flow direction of the air flow.

The second flap 28 is movable between two extreme positions, a position in which it blocks access of the cold air flow to the second bypass path 26, and a position in which it blocks access of the cold air flow to the first heat exchanger 6. Naturally, the second flap 28 may assume any intermediate position.

According to a first embodiment, the second flap 28 may be of a different type from the first flap 18.

It may for example be a drum flap. Naturally, any other type of flap, such as a curtain flap or butterfly flap, is suitable. In this case, in order to set the second flap 28 in motion, an actuator (not shown) is able to set the second flap 28 in rotation about a transverse axis, substantially parallel to axis Y indicated on FIG. 1, between the two extreme positions of the second flap 28.

According to a variant (not shown), the second flap 28 may be of the same type as the first flap 18, for example a flat sliding flap.

Naturally, in this case, in the same way as the first sliding flap 18, the second sliding flap 28 may comprise a gate on which a rack is arranged (not shown). In order to set the second flap 28 in motion, a gear (not shown) complementary to the rack may be set in rotation, by an actuator (not shown), about a transverse axis which is substantially perpendicular to the plane XZ and substantially parallel to axis Y indicated on FIG. 1. The rotation of the gear causes the translation movement of the gate between the two extreme positions. Since the two flaps 18, 28 are of the sliding type, they take up little space. They may be arranged substantially parallel to the vertical axis Z or be slightly inclined relative to this axis Z, such that the housing 4 of the heating, ventilation and/or air conditioning device 2 is more compact along its longitudinal axis X.

Whatever the embodiment of the second flap 28, depending on its position, the cold air flow from the second heat exchanger 8 is directed in variable proportions towards the first heat exchanger 6 and/or directly towards the second mixing chamber 22 and then towards the duct 24.

In a similar fashion to the top part of the housing 4, access of the cold air flow to the first heat exchanger is achieved for example via a second conduit 29, corresponding to another portion of the air flow channel 3 situated between the separating element 30 (which will be described below) and the first heat exchanger 6.

As seen above, the heating, ventilation and/or air conditioning device 2 according to the invention comprises two mixing chambers 15, 22, each able to receive an air flow which has passed through the first heat exchanger 6.

Separation of Upper and Lower Parts of Housing 4 from the Heating, Ventilation and/or Air Conditioning Device 2

Separation of Air Flow Directed Towards Mixing Chambers 15, 22

In order to guarantee that each mixing chamber 15, 22 receives the appropriate quantity of warm air flow, the heating, ventilation and/or air conditioning device 2 comprises a separating element 30 allowing division of the air flow from the second heat exchanger 8 into two separate air flows, each intended to be directed towards a specific mixing chamber 15, 22. Each air flow is able to pass through part of the first heat exchanger 6 via conduits 19, 29 and/or a bypass path 16, 26 in order to reach the respective mixing chamber 15, 22, in sufficient proportions to guarantee the respective reference temperatures.

The separating element 30 is for example arranged close to the first heat exchanger 6. In the embodiment described, in which the first and second flaps 18, 28 are arranged upstream of the first heat exchanger 6, in complementary fashion, the separating element 30 is also arranged upstream of the first heat exchanger 6.

In this example, the separating element 30 is situated close to the first heat exchanger 6 between its ends, in other words between the virtual extension lines of the ends of the first heat exchanger 6. In the example illustrated, the separating element 30 is arranged relative to the longitudinal ends of the first heat exchanger 6. The separating element 30 may for example be situated substantially in the middle of the height of the first heat exchanger 6, such that the section of the first conduit 19 is equal to that of the second conduit 29. The separating element 30 may also be located such that the section of the first conduit 19 is greater than that of the second conduit 29, or vice versa.

The separating element 30, as illustrated on FIGS. 2a, 2b, 4 and 5a, corresponds to a set of walls connected together and forming a hollow polygon. However, a single wall may suffice to fulfil this function.

The separating element 30 advantageously comprises receiving means such as support portions which are able to receive the first and second flaps 18, 28.

As a non-limitative example, these receiving means may comprise at least one support portion against which the first flap 18 or second flap 28 comes to rest, and selected from: an inwardly curved wall, a flat wall, or a protrusion molded onto a flat wall.

Also, in the embodiment illustrated comprising an additional electric radiator 7 arranged close to the first heat exchanger 6, in this example downstream in the flow direction of the air flow, a separating wall 30' may be provided which is arranged between the first heat exchanger 6 and the additional electric radiator 7, forming an extension of the separating element 30. The separating wall 30' is thus arranged substantially at the same height level of the first heat exchanger 6 as the separating element 30.

Separation of Mixing Chambers 15, 22

As described above, such a device 2 is suitable for multizone thermal conditioning, i.e. different zones of the vehicle may be ventilated at different temperatures.

A passenger may set a reference temperature for the air flow from the first mixing chamber 15, and another passenger may set a different reference temperature for the air flow from the second mixing chamber 22.

Typically, for a heating, ventilation and/or air conditioning device working in three-four zone or double layer mode, it is advantageous to have two independent mixing chambers 15, 22. However, for a one-two zone mode, it is more advantageous to have dependent mixing chambers 15, 22.

In order to guarantee the dependence or independence of the two mixing chambers 15, 22, a separating flap 32 is arranged between the two mixing chambers 15, 22 and is thus able to either connect them or isolate them one from the other.

Naturally, the separating flap 32 connects the two mixing chambers 15, 22 by adopting an extreme "open" position as illustrated on FIGS. 2a and 2b, and isolates the two mixing chambers 15, 22 by adopting an extreme "closed" position as illustrated on FIGS. 4 and 5a, and thus defines the upper part of the housing 4, comprising the first mixing chamber 15, and the lower part of the housing 4, comprising the second mixing chamber 22, on either side of the separating flap 32.

The separating flap 32 is here aligned with the separating element 30, and where applicable the separating wall 30'. This alignment allows division of the housing 4 into two compartments.

Also, the first opening 17 at the longitudinal end face 4b of the housing 4 leading to the first mixing chamber 15, and the second opening 27 of the housing 4 leading to the second mixing chamber 22, are arranged on either side of the separating flap 32 in the vertical axis Z. More precisely, the first opening 17 is situated above the separating flap 32, and the second opening 27 is situated below the separating flap 32.

Adaptation of the Heating, Ventilation and/or Air Conditioning Device 2 Depending on Operating Mode Depending on the operating mode selected for the heating, ventilation and/or air conditioning device 2, either the first additional module 200 adapted for a one-two zone or double layer mode, or the second additional module 300 adapted for a three-four zone mode, is mounted on the housing 4, here at its longitudinal end face 4b.

More precisely, the additional module 200 or 300 is intended to be mounted in the assembly cavity of the housing 4, so as to delimit an air flow circulation channel directed towards the front footwell region of the vehicle.

To this end, the assembly cavity (not shown on the figures) is arranged on the housing 4 such that the front footwell outlet duct 14 opens into this assembly cavity. As a result, the assembly cavity is delimited by the walls of the housing 4, and in particular by the walls of the housing 4 delimiting the front footwell outlet duct 14.

Also, in the particular example described, the second opening 27 of the housing 4 also opens into the assembly cavity so as to connect the second mixing chamber 22 and the assembly cavity. It is evident that this is possible when the second opening 27 is open.

Naturally, the additional module 200 or 300 has a form complementary to the form of the assembly cavity. In particular, the periphery of the additional module 200 or 300 may be shaped to closely follow the form of the walls of the housing 4 delimiting the assembly cavity.

The additional module 200 or 300 may be fixed to the housing 4 by any appropriate means.

Additional Module 200 for a One-Two Zone or Double Layer Operation

With reference to FIGS. 2a to 4, a first additional module 200 for a one-two zone or double layer mode is arranged on the housing 4.

The first additional module 200 is arranged so as to delimit an air flow circulation channel between the second opening 27 of the housing 4 leading to the second mixing chamber 22, and the front footwell outlet duct 14. In this way, the front footwell outlet duct 14 is connected to the second mixing chamber 22 via the second opening 27, so that it can be supplied by the second mixing chamber 22.

In this case, the first opening 17 leading to the first mixing chamber 15 is closed. In the example illustrated on FIGS. 2a, 2b, 3a and 4, this first opening 17 is closed by the partition C of the housing 4, more precisely by the partition C of the longitudinal end face 4b of the housing 4.

Moreover, the first additional module 200, most clearly shown on FIGS. 3a to 3c, comprises a closing wall 202 closing the inlet of the assembly cavity provided on the housing 4. The term "inlet of the cavity" designates the zone of the cavity accessible from the outside of the housing 4 and allowing mounting of the first additional module 200 or second additional module 300 on the housing 4. In the embodiment illustrated, the inlet of the cavity is arranged in a plane situated below the separating flap 32 in the vertical axis Z.

The closing wall 202 thus closes access to the assembly cavity from the outside of the housing 4. To achieve this, the closing wall 202 has a form complementary to the form of the inlet of the assembly cavity provided on the housing 4.

The closing wall 202 may have at least one substantially flat portion 204. In the example illustrated, the closing wall 202 has a substantially flat central portion 204.

The closing wall 202 also has for example one or more portions 206, 208 which are raised relative to the flat portion 204. The term "raised" means that the portions 206, 208 described as raised protrude vertically beyond the flat portion 204 in axis Z when the heating, ventilation and/or air conditioning device 2 is mounted in the vehicle.

The raised portions 206, 208 are shaped so that they closely follow the shape of the edges of the walls of the housing 4 which delimit the assembly cavity able to receive the first additional module 200.

More precisely, in the example illustrated, the closing wall 202 has two side portions 206 which are raised relative to the flat portion 204. The two side portions 206 are arranged opposite each other on either side of the flat portion 204 in axis Y indicated on FIGS. 1 and 3b.

Each raised side portion 206 is, formed to cooperate with the form of the walls of the housing 4 delimiting the assembly cavity. In the embodiment described, in which the front footwell outlet duct 14 opens into the assembly cavity, the raised side portions 206 are shaped so as to cooperate with the walls of the housing 4 delimiting the front footwell outlet duct 14. More precisely, in this example the two raised side portions 206 are able to cooperate with the walls of the housing delimiting the front footwell outlet duct 14 on either side of the inner separating partition 5 of the housing 4.

Furthermore, in this example, the closing wall 202 has a raised front portion 208 linked to the flat portion 204 and to the two raised side portions 206, and shaped so as to be able to cooperate with the walls of the housing 4 delimiting the assembly cavity below the separating flap 32.

In this example, the closing wall 202 also has a portion 210 which is lowered relative to the flat portion 204, i.e. situated below the plane defined by the flat portion 204 in axis Z in the state mounted in the vehicle, here a rear lowered portion 210 which is shaped so as to cooperate with the walls of the housing 4 delimiting the assembly cavity. This lowered portion 210 is connected to the flat central portion 204 and to the two raised side portions 206, and is arranged opposite the front raised portion 208 in axis X.

The first additional module 200 may also comprise a rear wall 212 extending parallel to plane YZ. The rear wall 212 is here intended to be inserted inside the assembly cavity of the housing 4. This rear wall 212 is able to come to rest against an inner wall of the housing 4, in the state when the first additional module 200 is mounted in the assembly cavity of the housing 4.

Finally, the first additional module 200 may advantageously comprise at least two side walls 214, here three side walls 214. In this example, the side walls 214 are connected by the rear wall 212.

The side walls 214 extend parallel to plane XZ and allow delimitation of sub-ducts of the front footwell outlet duct 14, firstly to supply the left-hand part of the vehicle and secondly to supply the right-hand part of the vehicle. The side walls 214 also allow delimitation of sub-ducts of duct 24 intended to supply the rear zone of the cabin, in particular towards the rear footwell and also towards one or more rear ventilation outlets.

The side walls 214 may also perform a support function for at least one flap shaft.

In the example illustrated, the side walls 214 form a shaft support for the flap 13 (cf. FIG. 2a) arranged in the front footwell outlet duct 14 in order to control or block access of the air flow. To this end, support means such as notches 216 are provided in the side walls 214 (cf. FIGS. 3b and 3c). The notches 216 have a shape complementary to the shaft of the flap 13, here substantially semicircular in form. Also, in this example, the notches 216 are arranged in the side walls 214 in axis Z, for example on the peripheral edge of each side wall 214.

In the example illustrated, the side walls 214 also form a shaft support for flap 23 (cf. FIG. 2a) arranged in the duct 24 for supplying the rear zone of the cabin, so as to control or block access of the air flow. To this end, support means such as notches 218 are provided in the side walls 214. The notches 218 have a shape complementary to the shaft of the flap 23, here substantially semicircular in form. Furthermore, in this example, the notches 218 are arranged on the side walls 214 in axis X, for example on the peripheral edge of each side wall 214.

Naturally, the form of the first additional module 200 is described above as an example. The form of the first additional module 200 may be adapted as a function of the form of the assembly cavity of the housing 4 receiving the first additional module 200.

Additional Module 300 for Three-Four Zone Operation

With reference to FIGS. 5a to 5d, a second additional module 300 for a three-four zone mode is arranged on the housing 4 in place of the first additional module 200, as described with reference to FIGS. 2a to 4. The second additional module 300 is arranged so as to delimit a circulation channel for the air flow between the first opening 17 of the housing 4 leading to the first mixing chamber 15, and the front footwell outlet duct 14. In this way, the front footwell outlet duct 14 is connected to the first mixing chamber 15 via the first opening 17, so that it can be supplied by this first mixing chamber 15.

For this, the second additional module 300 comprises an outer wall 302 delimiting the air flow circulation channel which connects the first opening 17 of the housing 4 to the front footwell outlet duct 14. The term "outer" wall means that when the second additional module 300 is mounted on the housing 4, this outer wall 302 is accessible from the outside of the housing 4.

The first mixing chamber 15 is here in aeraulic communication with the front footwell outlet duct 14 via the assembly cavity. In other words, the second additional module 300 is arranged in the assembly cavity without closing the inlet of the assembly cavity. Thus the air flow coming from the first mixing chamber 15 may circulate towards the front footwell outlet duct 14 by passing through the inlet of the assembly cavity.

The air flow circulation channel delimited by the outer wall 302 of the second additional module 300 forms an air flow diversion channel, relative to the air flow circulation channel in the one-two zone or double layer operating mode of the heating, ventilation and/or air conditioning device 2, which is defined by the first additional module 200 previously described with reference to FIGS. 3a to 3c.

Also, in the embodiment illustrated, the outer wall 302 of the second additional module 300 comprises:
  a first part 304 extending along a curve, and
  a second part 306 extending substantially parallel to the face of the housing 4, here the end face 4b, carrying the second additional module 300.

The first part 304 is substantially outwardly curved or convex with a convexity oriented towards the outside of the second additional module 300.

In the embodiment shown on FIGS. 5a and 5b, the first part 304 of the outer wall 302 is arranged above and remote from the inlet of the assembly cavity in axis Z.

The first part 304 is formed so as to closely follow the form of the edges of the walls of the housing 4 delimiting the first opening 17 of the housing 4. This is in particular the face of the first part 304 of the outer wall 302 intended to face the face 4b of the housing 4, here the longitudinal end face 4b, which is shaped to cooperate with the walls delimiting the first opening 17 during assembly.

In this case, with reference to FIGS. 5a to 5d, the second additional module 300 advantageously comprises an orifice 307 intended to be arranged facing the first opening 17 provided on the housing 4. In particular, this orifice 307 is arranged in the face of the first part 304 of the outer wall 302 facing the housing 4. The orifice 307 is thus intended to be arranged above the separating flap 32 on assembly. This orifice 307 defines an inlet of the air flow circulation channel through the second additional module 300, and when the second additional module 300 is mounted on the housing 4, allows the air flow from the first mixing chamber 15 to pass through the second additional module 300.

Furthermore, an inflection point may be provided at the intersection 308 of the two parts 304 and 306 of the second additional module 300.

Also, since the second additional module 300 is intended to be mounted on the housing 4 with at least part—here the first substantially curved part 304—above the separating flap 32, the face of the second additional module 300 facing the separating flap 32 has a recess of substantially rounded form 309 in axis Y indicated on FIGS. 1 and 5c, in order to cooperate with the shaft of the separating flap 32.

The second additional module 300 may also have a rear part 310 on the periphery of the second part 306, which is shaped so as to cooperate with the walls of the housing 4 delimiting the assembly cavity.

Also, the second additional module 300 advantageously comprises (in this example at the level of the first part 304) a passage 311 for an additional flap 34 intended to be arranged movably in the air flow diversion channel formed between the first opening 17 and the front footwell outlet duct 14, thanks to this second additional module 300. This additional flap 34 has the function of controlling or blocking access of the air flow.

The second additional module 300 also advantageously comprises a rear wall 312 extending parallel to plane YZ. The rear wall 312 is here intended to be inserted inside the assembly cavity of the housing 4. This rear wall 312 is able to come to rest against an inner wall of the housing 4 in the state when the second additional module 300 is mounted in the assembly cavity of the housing 4.

Furthermore, according to the embodiment illustrated on FIGS. 5c and 5d, the second additional module 300 may have one or more side walls 314, for example two side walls 314. In this example, the side walls 314 are connected by the rear wall 312.

The side walls 314 extend parallel to plane XZ and allow delimitation of sub-ducts of the front footwell outlet duct 14, firstly to supply the left-hand part of the vehicle and secondly to supply the right-hand part of the vehicle. The side walls 314 also allow delimitation of sub-ducts of duct 24 intended to supply the rear zone of the cabin, in particular towards the rear footwell and also towards one or more rear ventilation outlets.

In a similar fashion to the first additional module 200, the side walls 314 of the second additional module 300 may also perform a support function for at least one flap shaft.

In the example illustrated, the side walls 314 form a shaft support for the flap 13 (cf. FIGS. 5a and 5b) arranged in the front footwell outlet duct 14 in order to control or block access of the air flow. To this end, support means such as notches 316 are provided in the side walls 314 (cf. FIGS. 5c-5d). The notches 316 have a shape complementary to the shaft of the flap 13, here substantially semicircular in form. Also, in this example, the notches 316 are arranged in the side walls 314 in axis Z, for example on the peripheral edge of each side wall 314.

In the example illustrated, the side walls 314 also form a shaft support for the flap 23 (cf. FIGS. 5a-5b) arranged in the duct 24 for supplying the rear zone of the cabin, in order to control or block access of the air flow. To this end, support means such as notches 318 are provided in the side walls 314. The notches 318 have a shape complementary to the shaft of the flap 23, here substantially semicircular in form. Furthermore, in this example, the notches 318 are arranged in the side walls 314 in axis X, for example on the peripheral edge of each side wall 314.

Also, when the second additional module 300 is arranged on the housing 4 in order to connect the front footwell outlet duct 14 to the first mixing chamber 15, the second opening 27 leading to the second mixing chamber 22 is closed.

In the embodiment illustrated, to this end, the second additional module 300 has an inner wall 320 which forms a partition for closing the second opening 27 of the housing 4. The term "inner" wall means that when the second additional module 300 is mounted on the housing 4, this inner wall 320 is situated inside the heating, ventilation and/or air conditioning device 2.

Here, the front inner wall 320 has at least one portion extending in axis Z. In the example illustrated, the inner wall 320 also has a portion extending in axis X.

Also, in a fashion complementary to the notches 316, this inner wall 320 may have substantially rounded portions 322 complementary to the shape of the shaft of flap 13, and allowing passage of the shaft of flap 13.

Naturally, the form of the second additional module 300 is described above as an example. The form of the second additional module 300 may be adapted as a function of the form of the assembly cavity of the housing 4 receiving the second additional module 300.

Also, the space required for the housing 4 receiving the second additional module 300 is substantially the same as the space required for the housing 4 receiving the first additional module 200.

Assembly of the Heating, Ventilation and/or Air Conditioning Device 2

The method of assembling a heating, ventilation and/or air conditioning device 2 as described above comprises a step of assembling the housing 4 such that it defines:

- at least the front footwell outlet duct 14 of said vehicle; here, the housing 4 furthermore defines ducts 10 for demisting of the windscreen, 12 for side/central ventilation of the front of the cabin, and 24 for ventilation of the rear and the rear footwell of the cabin,
- the first air flow mixing chamber 15,
- the second air flow mixing chamber 22,
- the first opening 17 leading to the first mixing chamber 15,
- the second opening 27 leading to the second mixing chamber 22, and
- the assembly cavity able to receive one or the other additional module 200 or 300.

Furthermore, a step may be provided of mounting the inner separating partition 5 dividing the housing 4.

Naturally, this assembly step may comprise a sub-step of arranging components within the housing, such as the thermal conditioning means, in this example the first heat exchanger 6, the additional radiator 7, the second heat exchanger 8, flaps 18, 28 and where applicable flaps 9, 11, 13 and 23 in the ducts 10, 12, 14 and 24 respectively.

The assembly method also comprises a step of arranging the separating flap 32 movably in the housing 4, between the first mixing chamber 15 and the second mixing chamber 22, so as to be able to isolate or connect the first mixing chamber 15 and the second mixing chamber 22 depending on the position of the separating flap 32.

Finally, the method also comprises a step of insertion and mounting of a first additional module 200 for a one-two zone mode in the assembly cavity of the housing 4, in aeraulic communication with said duct 14 and the second opening 27, so as to delimit an air flow circulation channel between the second opening 27 and said duct 14. In this case, the method also comprises a step of mounting the partition C closing the first opening 17 of the housing 4.

The heating, ventilation and/or air conditioning device is then suitable for use for homogenous thermal conditioning of the cabin, either in a double layer mode or also in a mode allowing thermal distinction between the right and left-hand sides of the cabin thanks to the inner separating partition 5.

Alternatively, the method comprises a step of insertion and mounting of an additional module 300 for a three-four zone mode in the assembly cavity of the housing 4, in aeraulic communication with said duct 14 and the first opening 17, so as to delimit an air flow circulation channel between the first opening 17 and said duct 14. In this case, an inner wall 320 of the second additional module closes the other opening 27 of the housing and there is no need to provide an additional partition.

The heating, ventilation and/or air conditioning device is then suitable for use for thermal conditioning with thermal distinction between the front and rear, and in some cases for the front and/or rear zones, with thermal distinction between the right and left-hand parts of the cabin thanks to the inner separating partition 5.

Naturally, the order of the steps described above may be inverted without leaving the scope of the invention.

Function of the Heating, Ventilation and/or Air Conditioning Device 2

One-Two Zone Mode

For mono-zone or bi-zone function, the flap 32 separating the two mixing chambers 15, 22 is arranged in the "open" position connecting the two mixing chambers 15, 22, as illustrated on FIGS. 2a and 2b. The first mixing chamber 15 and the second mixing chamber 22 are in this case dependent on each other, or in other words in aeraulic communication with each other.

The first additional module 200 is arranged on the housing 4 at the assembly cavity of the housing 4, so as to delimit an air flow circulation channel between the second mixing chamber 22 and the front footwell outlet duct 14 via the second opening 27 of the housing 4.

Furthermore, on its end face 4b, the housing 4 has a partition C closing the first opening 17.

In this way, the front footwell outlet duct 14 is supplied with air by the second mixing chamber 22 via the second opening 27 of the housing 4, but also by the first mixing chamber 15.

Thus a homogenous thermal conditioning may be performed, by means of which the different zones of the vehicle are ventilated at a same temperature, i.e. in a mono-zone or single zone operating mode.

As a variant, a thermal conditioning may be performed with distinction of temperatures between the left and right-hand parts of the cabin thanks to the arrangement of the inner separating partition 5, and the independent control of the flaps in each of the left and right-hand parts of the heating, ventilation and/or air conditioning device 2. Such operation is then called bi-zone or two zone mode, and allows separate control of the air flow at the outlets to the seats on the left and right-hand sides of the cabin respectively.

Double Layer Mode

In contrast, if the heating, ventilation and/or air conditioning device 2 is to function in the double layer mode in which the cabin air at a higher temperature is blown through the footwell nozzles and the external air with a lower humidity level is blown through the demisting nozzles, the separating flap 32 is arranged in the "closed" position, isolating the two mixing chambers 15, 22 as illustrated on FIG. 4.

The first additional module 200 is therefore, as in the one-two zone operating mode, arranged on the housing 4 at the assembly cavity of the housing 4 so as to delimit an air flow circulation channel between the second mixing chamber 22 and the front footwell outlet duct 14 via the second opening 27 of the housing 4.

In the double layer mode, on its end face 4b, the housing 4 again has a partition C closing the first opening 17.

Thus the front footwell outlet duct 14 is supplied with air solely by a single mixing chamber, here the second mixing chamber 22.

Three-Four Zone Mode

In another variant, if the heating, ventilation and/or air conditioning device 2 is to function in a three-four zone mode, allowing thermal conditioning with different temperatures between the front and rear zones and/or right and left zones, the separating flap 32 is arranged in the "closed" position isolating the first mixing chamber 15 and the second mixing chamber 22, and the second additional module 300 is arranged on the housing 4 at the assembly cavity of the housing 4, so as to delimit an air flow circulation channel between the first mixing chamber 15 and the front footwell outlet duct 14 via the first opening 17 of the housing 4.

In this way, the air flow is able to circulate from the first mixing chamber 15, in the upper part of the housing 4 relative to the separating flap 32, into the air flow circulation channel formed by the second additional module 300. The air flow is diverted relative to the air flow circulation channel defined according to the preceding one-two zone or double layer modes.

Furthermore, the second opening 27 of the housing 4 is advantageously closed by the second additional module 300.

Thus the front footwell outlet duct 14 is supplied with air by a single mixing chamber, here the first mixing chamber 15.

It is understood that when the heating, ventilation and/or air conditioning device 2 is intended to function for thermal conditioning in a one-two or double layer mode, it is sufficient to arrange the first additional module 200 on the housing 4 and provide a partition C on the face 4b of the housing 4 to close the first opening 17. The front footwell outlet duct 14 is thus in aeraulic communication with the second mixing chamber 22. Depending on the position of the separating flap 32, the front footwell outlet duct 14 may be supplied solely by this second mixing chamber 22 or also by the first mixing chamber 15.

In contrast, for thermal conditioning in a three-four zone mode, this time it is sufficient to arrange a second additional module 300 on the housing 4. The front footwell outlet duct 14 is thus supplied by the first mixing chamber 15.

The adaptation to the needs of manufacturers consists of arranging one or the other of the additional modules 200 or 300 on a face 4b of the housing 4, and in some cases adapting this face 4b by providing, for example, a partition C for closing the first opening 17. This adaptation may be made at minimum cost.

The main body of the housing 4 formed by the faces 4a, 4c, 4d may be standardized and remains unchanged for all operating modes. The internal components of the heating, ventilation and/or air conditioning device 2, in particular the heat exchangers 6, 7, 8, the flaps 18, 28 and the separating flap 32, and their arrangement within the housing 4, may remain identical. Nor is it necessary to provide additional elements such as additional flaps in the air flow channel 3 defined by the housing 4.

Finally, the dimensions of the heating, ventilation and/or air conditioning device 2 with the first additional module 200 or second additional module 300 are relatively compact.

The invention claimed is:

1. A device for heating, ventilation and/or air conditioning of a vehicle cabin of a motor vehicle, said vehicle cabin comprising a front zone and a rear zone in the direction of travel of said vehicle, said device comprising:
   a housing comprising:
      a duct for distributing an air flow to the footwell in the front zone of said vehicle,
      a first air flow mixing chamber,
      a second air flow mixing chamber,
      a separating flap arranged movably so as to isolate or connect the first mixing chamber and the second mixing chamber,
      a first opening leading to the first mixing chamber,
      two end faces in a longitudinal axis congruent with a longitudinal axis of the vehicle when the device is mounted in said vehicle,
      a second opening leading to the second mixing chamber, the first and second openings being arranged on either side of the separating flap, and
      an assembly cavity near said duct;
   a partition mounted on the housing to permanently close either the first or the second opening according to installation of an additional module being one of a first additional module or a second additional module configured to be installed on the housing in alternative to one another based on an operating mode of the device, wherein the first or second additional module is arranged in the assembly cavity of the housing, in aeraulic communication with said duct and with the first opening when the second opening is closed, or the second opening when the first opening is closed, so as to delimit selectively a circulation channel for the air flow between the first opening and said duct, or between the second opening and said duct, and wherein the additional module is arranged at a longitudinal end face of the housing.

2. The device as claimed in claim 1, wherein:
the additional module is mounted on the longitudinal end face of the housing, and
the partition closing the first opening or the second opening depending on the operating mode of said device is a partition of the longitudinal end face of the housing for receiving the additional module.

3. The device as claimed in claim 1, wherein the partition closing the first opening or the second opening depending on the operating mode of said device is provided on the additional module.

4. The device as claimed in claim 2, wherein the housing has the partition closing the first opening, and the additional module for a one-two zone or double layer mode is mounted on the housing so as to delimit a circulation channel for the air flow between the second opening and said duct.

5. The device as claimed in claim 4, wherein the additional module for the one-two zone or double layer mode comprises a closing wall closing an inlet of the assembly cavity.

6. The device as claimed in claim 5, wherein the closing wall has a form complementary to the form of the inlet of the assembly cavity, and has at least one substantially flat portion.

7. The device as claimed in claim 3, wherein the second additional module for a three-four zone mode is mounted on the housing, the second additional module comprising firstly an outer wall delimiting an air flow circulation channel which connects the first opening of the housing to said duct, and secondly an inner wall closing the second opening of the housing.

8. The device as claimed in claim 7, wherein the second additional module for the three-four zone mode further comprises an opening brought into aeraulic communication with the first opening of the housing.

9. The device as claimed in claim 7, wherein the second additional module for the three-four zone mode is mounted on the housing, and wherein the outer wall of the second additional module for the three-four zone mode comprises:
a first part extending along a curve, and
a second part extending substantially parallel to the face of the housing carrying said additional module.

10. The device as claimed in claim 9, wherein the first part of the outer wall of the second additional module for the three-four zone mode is substantially outwardly curved or convex with a convexity oriented towards the outside of the second additional module for the three-four zone mode.

11. The device as claimed in claim 7, wherein the second additional module for the three-four zone mode comprises a flap arranged movably in the air flow circulation channel.

12. The device as claimed in claim 4, wherein the additional module for the heating, ventilation and/or air conditioning device delimits a circulation channel for the air flow between the second opening of the housing of said device below the separating flap in a vertical axis when the device is mounted in said vehicle and wherein said duct, comprises:
a closing wall able to close an inlet of the assembly cavity.

13. The device as claimed in claim 7, wherein the second additional module for the heating, ventilation and/or air conditioning device delimits a circulation channel for the air flow between the first opening of the housing of said device above the separating flap in a vertical axis when the device is mounted in said vehicle and wherein said duct, comprises:
a hole arranged in aeraulic communication with the first opening of the housing.

* * * * *